3,293,126
WATER-DISPERSIBLE LIGNOSULFONATE FORMULATIONS OF METAL ETHYLENE BIS-DITHIO-CARBAMATES

John T. Person and Joe C. Eller, Houston, Tex., assignors to Dawson Chemical Co., Inc., Houston, Tex., a corporation of Texas
No Drawing. Filed Apr. 2, 1964, Ser. No. 356,966
4 Claims. (Cl. 167—42)

This application pertains to the manufacture of fungicides and to the fungicides provided thereby. The fungicides are metallic salts of ethylene bis-dithiocarbamate, all of which are known in the art, but which have heretofore not been provided in dispersible form. The manganese, zinc, and copper salts of ethylene bis-dithiocarbamate are especially suitable for use as fungicides.

The principal object of the invention is to provide the fungicide materials in dispersible form, so that they may be supplied in dry powder form and wetted or dispersed in water or other carriers for use, with the resulting dispersions being suitably stable for use after a holding period following their preparation. A further object of the invention is to provide fungicidal compositions as hereinafter described.

Metallic salts of carbamic acids have been used successfully as fungicides for many years. The salts are insoluble in water and common solvents used in preparing emulsifiable concentrates, so that their use has been limited in form to wettable powders and dusts. According to this invention, the production of manganese, zinc, and copper ethylene bis-dithiocarbamates in colloidal form, adapted for easy dispersion in water and having the property of extreme stability with little or no settling over a relatively long period of time has been achieved, so that the dispersed materials are very suitable for application by spraying.

The coverage on the leaf of a growing plant by a fungicide is critical to the effectiveness of the fungicide in that complete or almost complete coverage must be obtained to prohibit the growth of gungi. It can easily be seen that when the fungicide is provided in relatively large particle form, a larger amount of the fungicide material would be required per unit surface area to accomplish the necessary coverage than would be the case with a fungicide material of smaller particle size. The particle sizes of present formulations are of the order of 50 microns, whereas the fungicidal materials provided according to this invention are of particle sizes of about 3 microns, and less. This smaller partice size is important since it provides for adequate coverage with reduced dosages of the material per unit area, and because it makes the fungicide material easy to handle and to spray because of its easy dispersion characteristics. Excessive settling does not occur in the dispersions prepared with the material hereby provided.

According to this invention, it has been discovered that if small particle sizes of the fungicidal material are initially prepared, during the chemical reactions by which the materials are formed, that the small particle sizes may be maintained thereby achieving the desired product. The retention of the small particle sizes extends through the manufacturing, storage, distribution, and field application stages of the product. In manufacturing the product, a metallic salt, usually inorganic, is reacted with a water soluble salt of ethylene bis-dithiocarbamate. The ammonium and sodium salts of ethylene bis-dithiocarbamates have been used, with the ammonium salt giving somewhat better results because of improved product composition of the active metallic ion. The ammonium salt has a lower molecular weight than the sodium salt which provides this result.

It is common knowledge in chemical reactions that particle size formation is influenced by agitation and concentration in the solvent in which the reaction occurs. This initial small particle size formation is not difficult; however, maintenance of the small particle size thereafter in the case of these fungicide materials has been impossible to achieve. By this invention, lignosulfonate materials are employed to maintain the dispersions achieved during the initial reaction. The lignosulfonates are combined with the fungicide materials during manufacture and prior to the drying stage of the manufacturing process, so that there is presented little opportunity for the material to enlarge in particle size thereafter. The manganese, zinc, and copper ethylene bis-dithiocarbamates formed are substantially water insoluble. In the case of the manganese product, it was first intended to use manganese lignosulfonates during the manufacturing process. However, since manganese lignosulfonates have a fixed maximum concentration of manganese, it was thereafter determined that use of common calcium and other alkaline earth metal lignosulfonates would permit production of products of higher manganese concentrations. This same process has satisfactorily been applied to the zinc and copper fungicide materials.

Other objects and advantages of the invention will be made apparent during the following detailed description of preferred embodiments of the invention, with examples relating to the manufacture of the manganese, zinc, and copper ethylene bis-dithiocarbamate fungicide products. The manufacture of the desired products according to the invention is carried out by reacting a common lignosulfonate, for example the calcium or sodium lignosulfonate, usually in water solution, with a manganese, zinc, or copper salt, usually inorganic, in proper stoichiometric amounts. With proper selection of reacting materials, it is possible to precipitate the cation of the lignosulfonate salt combined with the anion of the metallic salt, from a solution, thereby excluding a substantial bulk of reactant material from the final product and permitting the product concentration to be maximum. This initial reaction provides a solution of the metal lignosulfonate, which in turn is reacted with diammonium ethylene bis-dithiocarbamate to form a dispersion of manganous ethylene bis-dithiocarbamate. The maganese ethylene bis-dithiocarbamate is in very small particle form in the resulting dispersion, the particle size being usually about 3 microns and smaller. Simultaneously resulting in this secondary reaction mixture, is a solution of ammonium or sodium lignosulfonate and sometimes also in solution there is the metal salt which was employed in the original initial reaction. After the secondary action has taken place, usually requiring only a few minutes, say, for example, five minutes, the dispersion is introduced into a dryer, usually a spray dryer or some other form of dryer which will fairly rapidly dry the material without forming large lumps or cakes during the drying process, and dried to form a dry powder material which is a mixture of the metal ethylene bis-dithiocarbamate and the other materials resulting from the second reaction. The drying may be done under vacuum or pressure conditions, the only critical feature of drying being that the temperature must be such as not to destroy the products. The metal ethylene bis-dithiocarbamate materials may be made in active concentrations up to approximately 60% concentration (by weight). The dry powder material formed exhibits very good wetting and dispersing properties and gives extremely good distribution on plant surfaces and good retentivity.

The products formed have the lignosulfonate materials uniformly distributed throughout, and the lignosulfonates provide the dispersing properties of the materials which are maintained throughout the life of the materials.

When applied to plants, the uniform distribution and high degree of retention provide for long active effectiveness of the material in the prevention of fungi, and also in the preevntion of bacteria growth.

A preparation containing 29.7% manganous ethylene bis-dithiocarbamate was prepared as follows:

162 grams of manganese lignosulfonate (8½% Mn) was dissolved in water with stirring. 128 grams of diammonium ethylene bis-dithiocarbamate (48%) was added to the manganese lignosulfonate solution slowly with a high degree of agitation of the mixture and the agitation was continued for 5 minutes after the addition of the diammonium ethylene bis-dithiocarbamate was complete, after which the dispersion was spray dried. The resultant dried material exhibited very good wetting and dispersing properties, and was found to have very effective fungicidal activity.

Another preparation containing 42.8% manganous ethylene bis-dithiocarbamate was prepared using calcium lignosulfonate, diammonium ethylene bis-dithiocarbamate and manganese sulfate. In this preparation, 90 grams of calcium lignosulfonate (4.9% calcium) was dissolved in 150 ml. of water. A second solution containing 68 grams of manganese sulfate (27.3% Mn) dissolved in 150 ml. of water was prepared. The second solution was admixed with the first solution and stirred until precipitation of calcium sulfate was complete. The suspension was then passed through a filter to remove the calcium sulfate ($CaSO_4 \cdot 2H_2O$). The filtrate was a solution of manganous lignosulfonate and manganese sulfate. To the filtrate, there was added 174 grams of diammonium ethylene bis-dithiocarbamate (48%), the addition being done slowly, and with agitation, and the agitation or stirring was continued for 5 minutes after the addition to enable the reaction to become substantially complete. The resultant slurry or suspension was spray dried. This preparation produced a dried product containing 42.8% manganous ethylene bis-dithiocarbamate and an equivalent amount of ammonium lignosulfonate. Ammonium sulfate was present in the product in the amount indicated by the stoichiometric proportions. Again, this formulation of manganous ethylene bis-dithiocarbamate exhibited good wetting and dispersing product properties, and was found to be highly effective as a fungicide.

Still another preparation containing 44% manganous ethylene bis-dithiocarbamate was prepared by dissolving 270 grams of calcium lignosulfonate (4.9% calcium) in 400 ml. of water. To this solution was added a solution of 206 grams of manganese sulfate dissolved in 400 ml. of water. Thereafter there was added a solution of 77 grams of calcium chloride dissolved in 125 ml. of water. This dispersion was filtered using a filter aid to yield a solution of manganous lignosulfonate and manganese chloride. To the recovered filtrate, there was added 520 grams of diammonium ethylene bis-dithiocarbamate (48%) slowly while stirring and the stirring was continued for about 5–6 minutes after the addition. The resultant slurry or dispersion was spray dried and the product contained 44% manganous ethylene bis-dithiocarbamate and an equal amount of ammonium lignosulfonate with ammonium chloride being present in the product as an impurity.

In still another example of the preparation of fungicide materials according to the invention, a zinc ethylene bis-dithiocarbamate preparation was made as follows: 140 grams of zinc lignosulfonate (14%) was dissolved in 140 grams of water being stirred in a Waring blender. 154 grams of diammonium ethylene bis-dithiocarbamate (48%) was slowly added to the solution in the Waring blender as violent agitation was continued. After the addition of the ethylene bis-dithiocarbamate was completed, stirring was continued for about 5 minutes. The resultant mixture was passed through a colloid mill and then spray dried. The resultant dried product contained 37.4% zinc ethylene bis-dithiocarbamate and was found to have excellent handling and dispersion properties.

A copper ethylene bis-dithiocarbamate preparation was also made in the following manner: 100 grams of calcium lignosulfonate (4.9% calcium) was dissolved in 100 grams of water. A second solution of 90.8 grams of copper sulphate in 100 grams of water was prepared. These two solutions were then mixed in a Waring blender. The resultant solution was filtered to remove the precipitated calcium sulphate. To the filtrate, there was added a solution of 186 grams of diammonium ethylene bis-dithiocarbamate (48%) in 100 grams of water. After the addition, stirring was continued for 5 minutes and the resulting dispersion was spray dried yielding a 43% copper ethylene bis-dithiocarbamate product which was readily dispersible in water and which upon application to plants was found to be of very good fungicidal capability.

It is noteworthy that the dispersible fungicide materials prepared according to this invention are excellently suited for use in spraying equipment. Previously, fungicidal formulations of the chemical types herein described have been difficult to handle because of the rapid settling of the active material when dispersed and because of resultant clogging of the spraying equipment. However, the preparations according to this invention when redispersed in water are very stable and present none of these problems. The materials have long shelf life and are in all ways suitable for their intended use. The method of manufacturing the materials has been found extremely satisfactory, and while only the manganese, zinc, and copper cations have been employed, it is possible that other metal salts known to be active fungicidally may be substituted. The products herein described have remarkable coverage capabilities when applied to foliage, because of the small particle size of the material, and smaller amounts are equally as effective as larger amounts of the older materials having larger particle sizes.

While preferred embodiments as to manufacture and preferred products according to the invention have been described, many modifications thereof may be made by a person skilled in the art without departing from the spirit of the invention, and it is intended to protect by Letters Patent all forms of the invention falling within the scope of the following claims:

We claim:
1. Method for preparing water dispersible formulations of metal ethylene bis-dithiocarbamates wherein the maximum particle size of the metal ethylene bis-dithiocarbamates is about 3 microns, or less, comprising preparing a solution of metal lignosulfonate in water, said metal being a metal selected from the group consisting of manganese, zinc and copper, adding to said solution, with agitation, a salt of ethylene bis-dithiocarbamate selected from the group consisting of sodium ethylene bis-dithiocarbamate and diammonium ethylene bis-dithiocarbamate, whereby metal ethylene bis-dithiocarbamate is precipitated in particulate form with the particles of about 3 microns size, or less, in the presence of the lignosulfonate, the lignosulfonate preventing growth of the precipitated particles, and drying the resulting dispersion of metal ethylene bis-dithiocarbamate to produce a dry powdered water dispersible metal ethylene bis-dithiocarbamate formulation wherein the maximum particle size of the metal ethylene bis-dithiocarbamates is about 3 microns, or less, and growth in particle size thereof is inhibited by said lignosulfonate.

2. Method according to claim 1, said dispersion being spray dried.

3. Method according to claim 1, said solution of metal lignosulfonate in water being prepared by preparing a solution of a metal salt of lignosulfonic acid selected from the group consisting of calcium lignosulfonate, ammonium lignosulfonate, sodium lignosulfonate and potassium lignosulfonate, in water,
preparing a water solution of a water soluble metal salt selected from the group consisting of zinc sulphate, zinc chloride, manganese sulphate, manganese chloride, copper sulphate and cupric chloride,
mixing the salt solutions to precipitate the cation of said metal salt of lignosulfonic acid with the anion of said metal salt in the resulting metal lignosulfonate solution,
and separating the metal lignosulfonate solution and precipitate by filtration.

4. Method according to claim 1, said metal lignosulfonate being prepared by
preparing a solution of a salt of lignosulfonic acid in water, said salt being selected from the group consisting of calcium lignosulfonate and sodium lignosulfonate,
preparing a water solution of a water soluble metal salt, said metal salt being selected from the group consisting of copper sulphate, manganese sulphate and zinc sulphate,
mixing said salt solutions,
preparing a water solution of calcium chloride, the cation of which will precipitate from water solution with the anion of said water soluble metal salt,
mixing said last-named solutions to said mixed salt solutions and separating the indicated precipitate therefrom to provide a solution of metal lignosulfonate and metal salt of said metal and the anion of said calcium chloride.

References Cited by the Examiner
UNITED STATES PATENTS

| | | | |
|---|---|---|---|
| 1,002,247 | 9/1911 | Ellis | 167—22 |
| 2,503,297 | 4/1950 | Pierce | 260—124 |
| 2,662,841 | 12/1953 | Fike | 167—22 |
| 2,778,768 | 1/1957 | Brown | 167—42 |
| 2,858,250 | 10/1958 | Geary | 167—42 |
| 2,929,700 | 3/1960 | Bennett | 71—1 |
| 2,935,504 | 5/1960 | King | 260—124 |

OTHER REFERENCES

Chem. Abstracts 37:4829(4) (1943).

LEWIS GOTTS, *Primary Examiner.*

ELBERT L. ROBERTS, *Examiner.*

S. ROSE, *Assistant Examiner.*